(12) United States Patent
Mima (10) Patent No.: US 8,386,940 B2
(45) Date of Patent: Feb. 26, 2013

(54) OPERATING SYSTEM AND A PROGRAM PRODUCT

(75) Inventor: Tsuyoshi Mima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1156 days.

(21) Appl. No.: 12/038,517

(22) Filed: Feb. 27, 2008

(65) Prior Publication Data

US 2008/0209352 A1 Aug. 28, 2008

(30) Foreign Application Priority Data

Feb. 28, 2007 (JP) ................................. 2007-049487

(51) Int. Cl.
*G06F 15/00* (2006.01)
*G06F 13/00* (2006.01)
(52) U.S. Cl. ........................................ 715/759; 715/772
(58) Field of Classification Search .................. 715/733, 715/750, 764, 771, 761–763, 772–775, 851–853; 345/418–475
See application file for complete search history.

(56) References Cited

U.S. PATENT DOCUMENTS

| | | | | |
|---|---|---|---|---|
| 2003/0214666 | A1* | 11/2003 | Osada | 358/1.13 |
| 2005/0183023 | A1* | 8/2005 | Maruyama et al. | 715/759 |
| 2006/0101344 | A1* | 5/2006 | Tabata | 715/761 |
| 2007/0094598 | A1* | 4/2007 | Nakai et al. | 715/703 |
| 2007/0150826 | A1* | 6/2007 | Anzures et al. | 715/772 |
| 2007/0192723 | A1* | 8/2007 | Anzelde et al. | 715/772 |

FOREIGN PATENT DOCUMENTS

| | | |
|---|---|---|
| JP | 2006-190245 A | 7/2006 |
| JP | 2007-024854 A | 2/2007 |
| WO | 02/03032 A | 1/2002 |

* cited by examiner

*Primary Examiner* — Cao "Kevin" Nguyen
(74) *Attorney, Agent, or Firm* — Canon USA, Inc., IP Division (57) ABSTRACT

Some embodiments of the present invention comprise a first provider adapted to provide a first user interface configured to receive an input about an instruction about an operation of an apparatus, the first user interface being provided in a first direction; a second provider adapted to provide a second user interface in conjunction with the first user interface, the second user interface being provided in a second direction; and an informer adapted to provide a status of the operation via the second user interface when the operation is performed.

13 Claims, 11 Drawing Sheets

ARRANGE POP-UP SCREEN SO THAT OPERATION BUTTON IS NOT OVERLAPPED AS WELL

CENTRAL VIEW DIRECTION SCREEN

LEFT AND RIGHT VIEW DIRECTION SCREEN

OPERATING SYSTEM AND A PROGRAM PRODUCT

BACKGROUND OF THE INVENTION

1. Field of the Invention

The present invention relates to an operating system applied for providing a user interface, and a program product.

2. Description of the Related Art

Among display apparatuses such as a display, a liquid crystal display apparatus capable of displaying different images in a plurality of directions has been developed (multiview display apparatus). For example, in the case of an in-vehicle apparatus such as a car navigation system, when a location for the apparatus to be attached to a car is practically fixed, navigation information is displayed as an image which is viewed from a driver's seat situated in a right direction, and an image of a DVD or a TV is displayed so as to be viewed from a passenger's seat situated in a left direction.

The multiview display apparatus can display a plurality of operation screens through a single display apparatus, and a technology related to an operation button corresponding to the operation screens has been proposed.

Japanese Patent Laid-Open No. 2006-190245 discloses a technology related to an adjustment with which display positions of operation input areas corresponding to the respective view directions displayed on a display unit are not overlapped with one another all the time.

Here, it is conceivable to use a certain apparatus such as a data processing apparatus by a plurality of users (operators). In this case, as this certain apparatus, a multifunction printer having a plurality of functions including a printing function is exemplified (hereinafter referred to as multifunction peripheral). Even during a print operation, such a multifunction peripheral can perform other operations such as a scan function and a send function in parallel. However, the respective functions are operated through a single operation screen, and if a user already operating a certain function exists, other users need to wait until the operation is finished.

According to the above-described related art, use of a multiview display apparatus provides two operation screens. Thus, it is possible to accept operations from a plurality of users at one time. However, if a certain user performs an operation through an operation screen in a certain direction, other users cannot use the operation screen in the certain direction until the operation based on the user's manipulation is finished.

For example, a consideration is provided of a case where a certain user performs a copy for a large amount of sets. When the user performs a setting for the copy from one direction among a plurality of directions and even after the copy operation is started, the screen indicating a status of the copy operation is displayed in the same direction. Even in a case where a send function can be used in parallel with the copy function, the former user occupies the certain direction for a long period of time. Other users cannot use an operation screen for the send function from the certain direction. Depending on a data processing apparatus, an operation screen may be more easily used when the operation screen is used from one direction among a plurality of directions. If the one direction is occupied for a long period of time, inconvenience is caused.

SUMMARY OF THE INVENTION

The present invention provides an operating system, and a program product, which overcome the above-described problem.

In addition, the present invention provides a structure that is applied for a contribution to a convenient operation environment.

According to an embodiment of the present invention, there is provided an operating system including: a unit adapted to provide a first user interface configured to receive an input about an instruction about an operation of an apparatus, the first user interface being provided in a first direction; a unit adapted to provide a second user interface in conjunction with the first user interface, the second user interface being provided in a second direction; and a unit adapted to provide a status of the operation via the second user interface when the operation is performed.

According to another embodiment of the present invention, there is provided a computer-readable storage medium storing a program for causing a computer system to perform a method, the method comprising: providing a first user interface configured to receive an input about an instruction about an operation of an apparatus, the first user interface being provided in a first direction; providing a second user interface in conjunction with the first user interface, the second user interface being provided in a second direction; and providing a status of the operation via the second user interface when the operation is performed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

DESCRIPTION OF THE EMBODIMENTS

Hereinafter, embodiments of the present invention will be described in detail with reference to the drawings.

Figure 1:
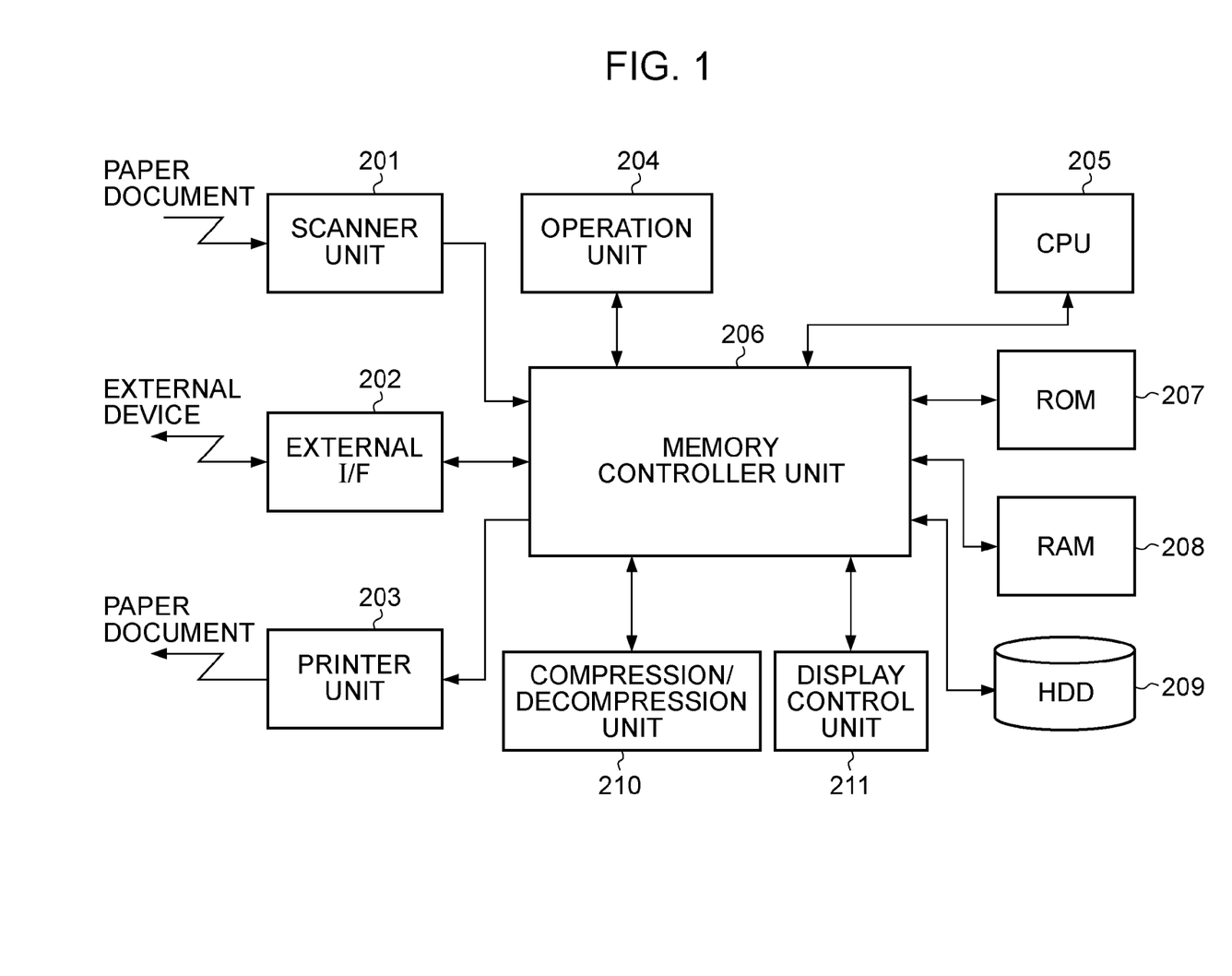
FIG. 1 is a function block diagram of a multifunction peripheral functioning as a data processing apparatus according to an embodiment of the present invention.

First, a description will be provided of a data processing apparatus corresponding to a certain apparatus which uses an operating system, and a program product according to an embodiment of the present invention. FIG. 1 is a function block diagram of a multifunction peripheral functioning as the data processing apparatus.

The multifunction peripheral is composed of a data processing apparatus provided with a plurality of functions such as a copy function for printing an image based on job data that is output from a scanner and a printing function for printing an image based on job data that is output from an external device such as a computer.

Types of the multifunction peripheral include a full color multifunction peripheral and a monochrome multifunction peripheral. In many cases, except a color processing, internal data, or the like, in a basic structure, the full color multifunction peripheral incorporates components of the monochrome multifunction peripheral. Herein, a description will be mainly provided of the full color multifunction peripheral, and an additional description will be provided of monochrome the multifunction peripheral when necessary.

In addition, embodiments of the present invention can of course be applied to a single function type data processing apparatus such as a data processing apparatus only provided with the printing function.

Hereinafter, the structure will be described together with an operation.

The present multifunction peripheral includes a scanner unit 201 adapted to read an image, an external I/F 202 adapted to transmit and receive image data and the like with a facsimile, a network connection apparatus, and an external dedicated apparatus, and a printer unit 203 adapted to form an image on a sheet after an image processing.

An operation unit 204 is a component used for selecting various flows and functions of the present multifunction peripheral and performing an operation and an instruction. Along with an achievement of a higher resolution in a display apparatus of the operation unit 204, it is also possible to preview and print image data stored in a document management unit.

The operation unit 204 uses a multiview liquid crystal display apparatus, and it is possible to display individually different operation screens corresponding to the respective plural view direction. According to the present embodiment, a triple view liquid crystal display apparatus which can display different operation screens corresponding to three view directions of front, right, and left is used.

A CPU 205 is operated based on a program read from a ROM 207 or an HDD 209. Also, the external I/F 202 analyzes PDL (page description language) code data received from a host computer. An operation for expansion to raster image data is also described in this program. Conversion from the PDL code data to the raster image data is processed by software.

A memory controller unit 206 controls accesses to storage apparatuses such as the ROM 207, a RAM 208, and the HDD 209. In a case where memory accesses compete against each other from a plurality of devices, the memory controller unit 206 performs an arbitration operation so that the accesses to the storage apparatuses are performed in turn based on an order of priority among these devices.

The ROM 207 is a read only memory. The ROM 207 stores a boot sequence program, font information, and the like in advance.

The RAM 208 is a memory in which read and write can be performed. The RAM 208 stores image data sent from the scanner unit 201 and the external I/F 202 via the memory controller unit 206, various programs, and setting information.

The HDD 209 is a large capacity storage apparatus. The HDD 209 stores image data which is compressed by a compression/decompression unit 210. The compression/decompression unit 210 compresses and decompresses the image data stored in the RAM 208 and the HDD 209 and the like through various compression methods such as JBIG and JPEG. Also, the HDD 209 stores various control programs which can be executed by a computer.

A display control unit 211 is adapted to control screens that should be displayed in the respective view directions of the multiview liquid crystal display apparatus in the operation unit 204. Also, the display control unit 211 reads a screen source stored in the RAM 208 to switch display contents displayed in the respective view directions in response to an operation by the user. Also, the display control unit 211 is adapted to adjust display positions of operation buttons so that the operation buttons in the operation screens in the respective view directions are not overlapped one another.

Figure 2:
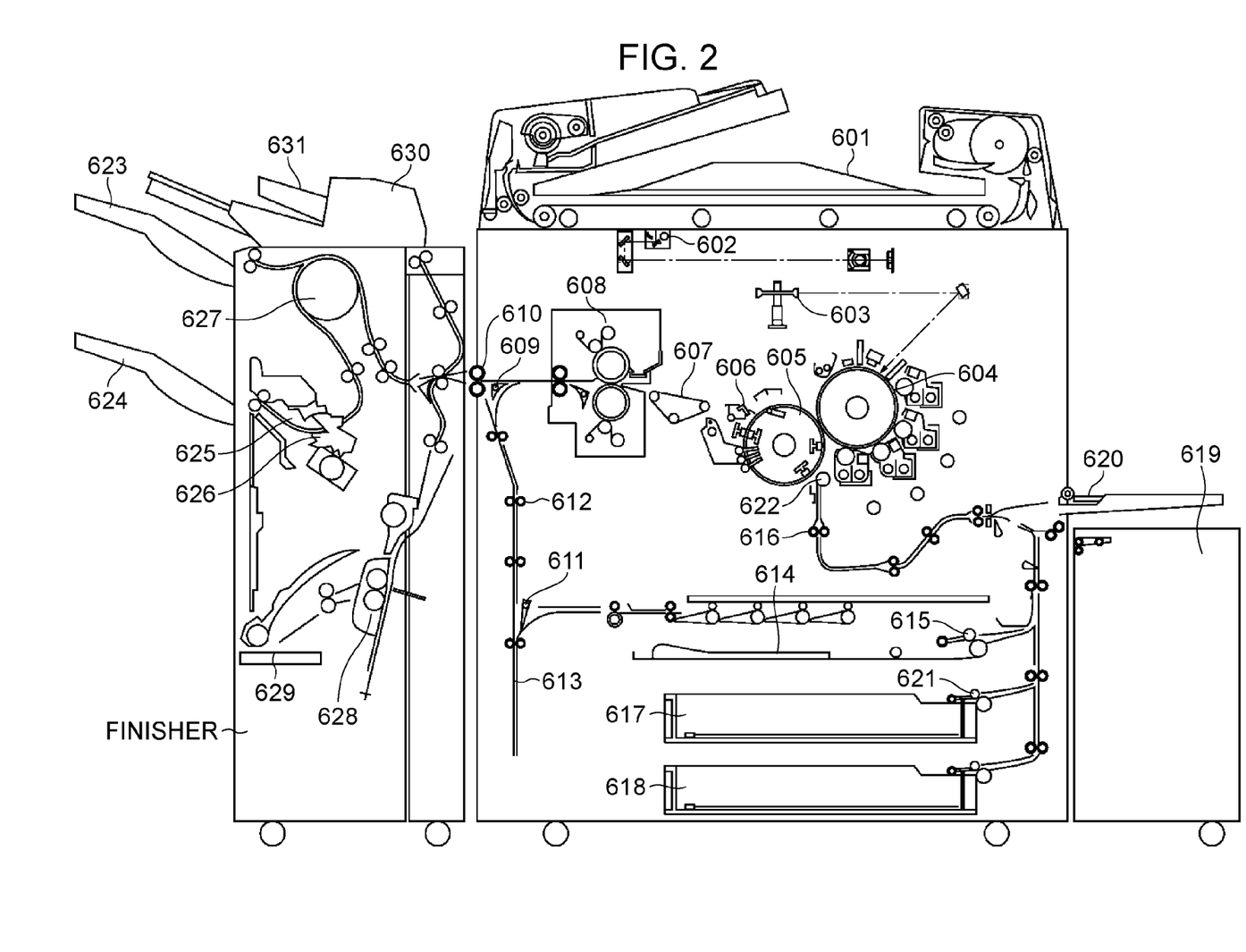
FIG. 2 is an entire configuration diagram of the multifunction peripheral functioning as the data processing apparatus according to the embodiment of the present invention.

FIG. 2 is an entire configuration diagram of the multifunction peripheral functioning as the data processing apparatus according to the embodiment of the present invention.

Hereinafter, the structure will be described together with an operation.

In FIG. 2, an automatic document feeder (ADF) 601 is adapted to sequentially separate a document batch set on a mounting surface of a document tray to feed a document onto a document plate glass.

A scanner 602 is adapted to read an image on the document fed onto the document plate glass and convert the image into image data through a CCD. A light beam such as laser light which has been modulated in accordance with the image data is incident on a rotatable polygon mirror (polygon mirror or the like) 603. The rotatable polygon mirror 603 irradiates a photosensitive drum 604 with the light functioning as reflection scanning light via a reflection mirror.

A latent image formed on the photosensitive drum 604 by the laser light is developed by toner and turned into a toner image. Then, the toner image is transferred to a sheet affixed on a transfer drum 605. The series of this image forming process is sequentially executed for toners of Yellow (Y), Magenta (M), Cyan (C), and Black (K), thus forming a full color image.

After the image forming process is executed for four times, the sheet on the transfer drum 605 on which the full color image is formed is separated by a separation nail 606 and conveyed to a fixing unit 608 by a pre-fixing conveyance belt 607.

The fixing unit 608 is composed of a combination of rollers and belts, and provided with a built-in heat source such as a halogen heater. The fixing unit 608 is adapted to fuse and fix the toners on the sheet on which the toner images are transferred by way of heat and pressure.

A sheet discharge flapper 609 is constructed to be able to swing about a swing axis and to regulate a conveyance direction for the sheet. When the sheet discharge flapper 609 is swung in the clockwise direction in the drawing, the sheet is conveyed straight to be discharged to the outside of the apparatus by sheet discharge rollers 610.

On the other hand, when images are formed on both sides of the sheet, the sheet discharge flapper 609 is swung in the counterclockwise direction in the drawing. The conveying direction of the sheet is changed in the downward direction and conveyed to a duplex conveyance unit.

The duplex conveyance unit is composed of a reversing flapper 611, reversing rollers 612, a reversing guide 613, and a duplex tray 614.

The reversing flapper 611 is constructed to be able to swing about a swing axis and to regulate a conveyance direction for the sheet. First, the reversing flapper 611 is swung in the counterclockwise direction in the drawing, and the sheet is conveyed to the reversing guide 613 by the reversing rollers 612.

While a trailing end of the sheet is nipped by the reversing rollers 612, the reversing rollers 612 are temporarily stopped, and subsequently, the reversing flapper 611 is swung in the clockwise direction in the drawing. Furthermore, the reversing rollers 612 are rotated in the opposite direction and the sheet is switchbacked to be conveyed. While the trailing end and a leading end are switched, the sheet is guided to the duplex tray 614.

In the duplex tray 614, the sheet is temporarily loaded, and thereafter, the sheet is conveyed backed to registration rollers 616 by refeeding rollers 615. At this time, the sheet is conveyed while a surface opposite to the first surface for the transfer step faces the transfer drum 605. Then, the image is formed on the second surface similarly to the above-described process. The sheet is subjected to the fixation step and discharged to the outside of the apparatus. In this way, the images are formed on both surfaces of the sheet.

A sheet feet conveyance unit is composed of sheet cassettes A 617 and B 618, a paper deck 619, a manual feed tray 620, sheet feed rollers 621, and the registration rollers 616.

Sheet of various sizes and various materials are contained in the sheet cassettes A 617 and B 618 and the paper deck 619. Various recording media including film materials such as an OHT sheet is mounted on the manual feed tray 620.

The sheet feed rollers 621 are respectively arranged to the sheet cassette A 617, the sheet cassette B 618, the paper deck 619, and the manual feed tray 620, and the sheet is fed thereto one by one. To be more specific, the loaded sheets are sequentially fed by pickup rollers. An overlapping feed is prevented by separation rollers provided while facing the sheet feed rollers 621. Thus, the sheet is conveyed to conveyance guides one by one.

At this time, a driving force for a rotation in a direction opposite to the conveyance direction is input to the separation rollers through a torque limiter not illustrated in the drawing. When only one sheet enters a nip portion formed between the separation rollers and the sheet feed rollers 621, the separation rollers are rotated in the conveyance direction while following the sheet.

On the other hand, in the case where the overlapping feed is generated, the separation rollers are rotated in the direction opposite to the conveyance direction to fetch the overlapped sheet. Thus, only one sheet on the top is conveyed.

The conveyed sheet is guided to a part between the conveyance guides, and conveyed to the registration rollers 616 by a plurality of sets of conveyance rollers. At this time, the registration rollers 616 are stopped. The leading end of the sheet abuts against a nip part formed by the pair of the registration rollers 616. Then, the sheet forms a loop and an oblique movement is corrected.

After that, in an image formation unit, in accordance with a timing of the toner image formed on the photosensitive drum 604, the rotation of the registration rollers 616 is started to convey the sheet. The sheet conveyed by the registration rollers 616 is electrostatically absorbed to a surface of the transfer drum 605 by an adsorption roller 622.

The sheet which is discharged from the fixing unit 608 of the printer unit enters an online finisher unit (when a finisher is connected). The online finisher unit includes a sample tray 623 and a stack tray 624. The sheet is discharged to the sample tray 623 or the stack tray 624, which is switched in accordance with a type of the job or the number of sheets to be discharged.

A sort method includes two types, and the sorting can be performed in the following manners. According to a bin sort method, a plurality of bins are prepared and sheets are sorted into the respective bins. According to a shift sort method, an electronic sort function and a bin (or, a tray) are shifted in depth directions to sort out discharged sheets for every job.

The electronic sort function is referred to as collation. If a large capacity memory is provided to a core unit, by using this large capacity memory and a so-called collation function for changing the buffered page order and discharge order, it is also possible to support an electronic sorting function. Next, a group function is for sorting the sheets for every page, whereas the sorting operation sorts the sheet for every job.

Furthermore, in a case where a staple mode is set for a job that should be discharged, such a control is performed that the sheets are discharged to the stack tray 624. At that time, before the sheets are discharged to the stack tray 624, the sheets are sequentially accumulated for every job in a processing tray 625 inside the finisher. On the processing tray 625, the sheets are bound by a stapler 626. Then, the sheet batch is discharged to the stack tray 624.

In addition, before reaching the above-described two trays, a punch processing is performed in accordance with a type of the job as a puncher 627 for punching two (or three) holes for a file is provided. For example, in a case where the punch processing is set via the operation unit by the user as a setting related to the sheet processing on the job that should be discharged, the punch processing by the puncher 627 is executed on the recording sheet of the job. Then, such a control is performed the sheet passes through the inside of the apparatus and discharged to the sheet discharge tray such as the stack tray 624 and the sample tray 623.

Furthermore, a saddle stitcher 628 is adapted to perform a processing for producing a booklet like a pamphlet (binding processing) by binding two positions at the center part of the sheets and hanging the center part of the sheets to the roller to make the center fold.

The sheet bound by the saddle stitcher 628 are discharged to a booklet tray 629. Whether the sheet processing operation such as the binding processing by the saddle stitcher 628 can be executed depends also on the sheet processing setting by the user on the job that should be discharged as described above.

In addition, an inserter 630 is adapted to convey a sheet which is set in an insert tray 631 to the sheet discharge tray such as the stack tray 624 and the sample tray 623 without passing through the printer.

With this structure, the sheet set in the inserter 630 can be inserted between the sheets conveyed to the online finisher unit (the sheets on which the print is performed in the printer unit). The sheets are set to be faced up in the insert tray 631 of the inserter 630, and the sheets are subsequently fed by the pickup rollers from the sheet on the top.

Therefore, the sheet from the inserter 630 is conveyed as it is to the stack tray 624 or the sample tray 623 to be discharged while being faced down. When the sheet is conveyed to the saddle stitcher 628, the sheet is once conveyed on the puncher 627 side. After that, the sheet is switchbacked and conveyed so that the face direction is matched to each other.

It is noted that whether the sheet processing operation such as the sheet insertion processing by the inserter 630 can be executed depends also on the sheet processing setting by the user on the job that should be discharged as described above.

Next, with reference to FIGS. 3 and 4, the operation unit 204 will be described.

Figure 3:
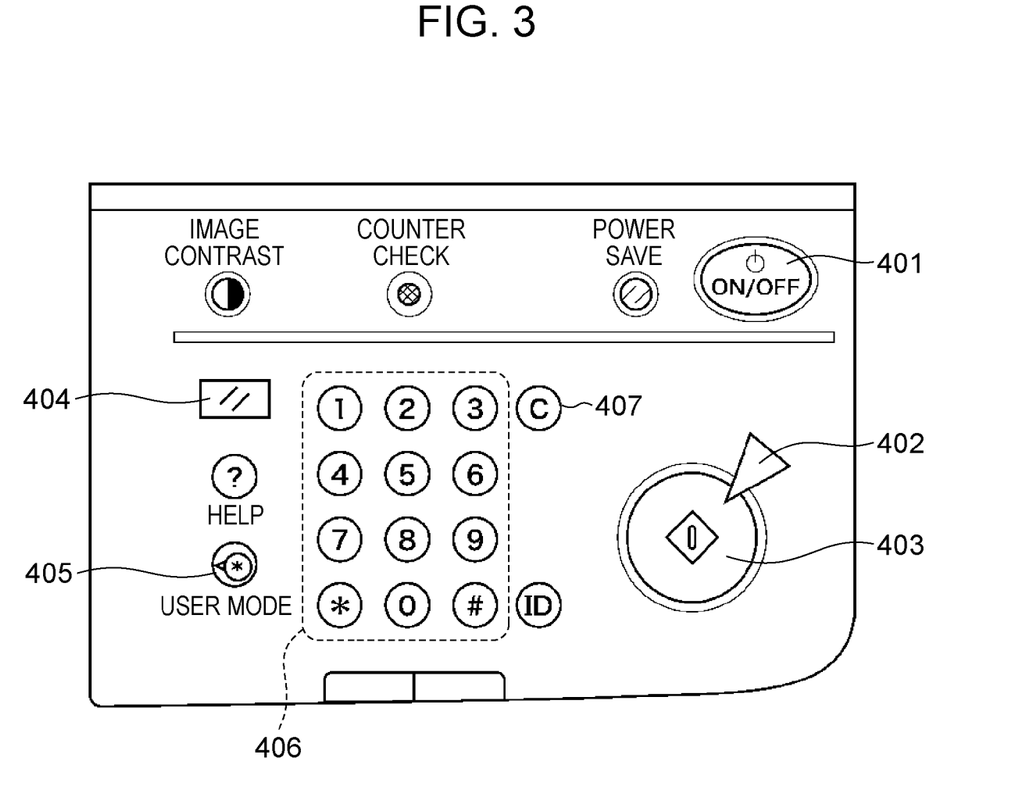
FIG. 3 is a configuration diagram of a key input unit of an operation unit illustrated in FIG. 1.

FIG. 3 is a configuration diagram of a key input unit of the operation unit 204 illustrated in FIG. 1.

In FIG. 3, an operation unit power supply switch 401 is adapted to switch between a standby mode (normal operation state) and a sleep mode (power save state). The operation unit power supply switch 401 can be used when a main power supply switch adapted to supply power to the entire system is in the ON state.

It is noted that the sleep mode refers to a state where the CPU 205 stops the program to be in an interruption state to stand by for the network print, the facsimile, and the like and the power consumption is suppressed.

A start key 403 is a key for instructing start of copy, send, and the like, and a stop key 402 is a key for interrupting the above-described operation.

A reset key 404 is a key for invalidating various settings to return the state to the default state. A reset key 405 is a key for shifting the screen to the system setting screen for every user. A ten-key 406 is a key for placing numerals for various settings. A clear key 407 is for canceling the placed numerals.

Figure 4:
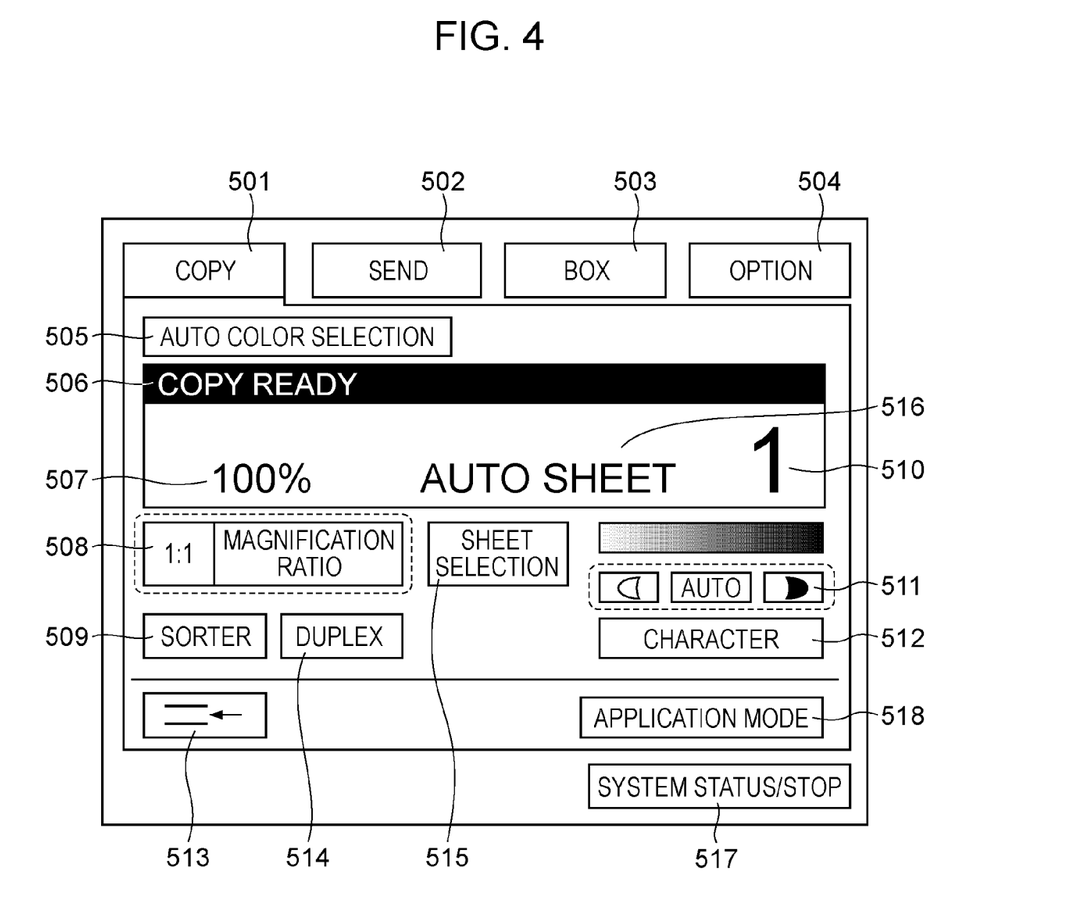
FIG. 4 is a configuration diagram of a liquid crystal display unit of the operation unit illustrated in FIG. 1.

FIG. 4 is a configuration diagram of a liquid crystal display unit of the operation unit 204 illustrated in FIG. 1.

To be more specific, FIG. 4 is a schematic diagram of a touch panel display composed of the liquid crystal display apparatus and a transparent electrode affixed on the liquid crystal display apparatus. The touch panel display previously stores a program, for example, for displaying another operation screen when the touch panel display detects a user's touch on the transparent electrode at a key part displayed on the liquid crystal display apparatus with a finger.

FIG. 4 illustrates an initial screen at the time of the standby mode. Various operation screens are displayed in accordance with the setting operations.

A copy tab 501 is a tab key for shifting the screen to the operation screen for instructing the copy operation. A send tab 502 is a tab key for shifting the screen to the operation screen for instructing the send operation such as a facsimile or an E-mail.

A box tab 503 is a tab key for shifting the screen to the operation screen for inputting and outputting a job in a box (which is a storage unit adapted to store a job for every user). An option tab 504 is a tab key for shifting the screen to the operation screen for setting an expansion function such as a scanner setting.

A color selection setting key 505 is a key for previously setting a color copy, a monochrome copy, or an auto selection. A status display unit 506 is a display unit adapted to display a simple status such as standby, warming up, jam, or an error.

A magnification ratio display unit 507 displays a magnification ratio set by a magnification ratio setting key 508. The magnification ratio setting key 508 is a key for shifting the screen to a screen for performing the magnification setting such as 1:1, enlargement, or reduction. A post processing setting key 509 is a key for shifting the screen to a screen for setting the presence or absence of a staple or a punch, the number, the location, and the like.

A sheet number display unit 510 displays the number of sheet specified by the ten-key 406 and which sheet among the batch is printed during the operation. A density setting key 511 is a key for an adjustment to increase or decrease the density of the output image.

An image mode setting key 512 is a key for selecting an image mode suited to an original image such as a character mode or a photograph mode. An interruption key 513 is used in the case where another job is inserted during the copy operation.

A duplex setting key 514 is a key for shifting the screen to a screen for selecting a single side print or a duplex print. A sheet size setting key 515 is a key for shifting the screen to a screen for selecting a sheet feed stage, a sheet size, and a medium type.

A sheet size display unit 516 displays the sheet size set by the sheet size setting key 515 and the mode set. A system monitor key 517 is a key for displaying the state and the status of the multifunction peripheral. By selecting the respective tabs, it is possible to shift to the respective operation modes.

An application mode key 518 is a key for shifting the screen to a screen for performing various settings including image processing and layouts such as a page continuous reading, a front page and inserted sheet setting, a reduction layout, and an image shift.

Next, a description will be provided of a principle of a triple view.

Figure 5:
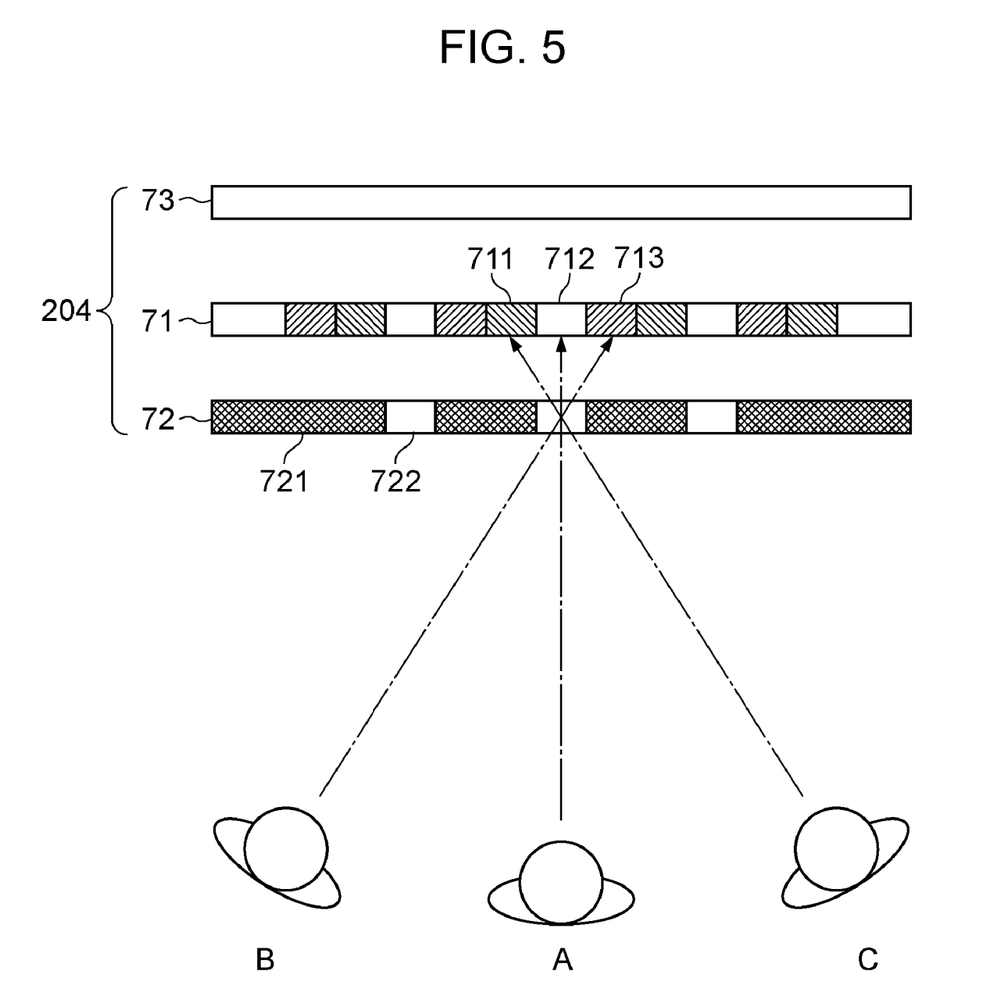
FIG. 5 illustrates a specific example of a configuration of the operation unit illustrated in FIG. 1 for describing a principle of a triple view.

FIG. 5 illustrates a specific example of a configuration of the operation unit 204 illustrated in FIG. 1 for describing the principle of the triple view.

In FIG. 5, the liquid crystal display apparatus of the operation unit 204 includes a data display unit 71 for displaying screen data and a slit plate 72 provided on a front side of the data display unit 71, that is, on a side close to a viewer. Also, the liquid crystal display apparatus includes a back light 73 provided on a rear side of the data display unit 71, that is, on a side far to the viewer.

The data display unit 71 is controlled by the display control unit 211. As illustrated in FIG. 5, the data display unit 71 is constructed by arranging the following areas side by side. That is, the data display unit 71 is constructed by arranging a plurality of areas 711 for displaying a right screen, a plurality of areas 712 for displaying a central screen, and a plurality of areas 713 for displaying a left screen, which are vertically long striped shaped areas, in the repeated order of the area 711, the area 712, and the area 713 side by side from the left.

In addition, the slit plate 72 is controlled by the display control unit 211 and composed by including closure parts 721 with which the data display unit 71 in the background cannot be seen from the front side and aperture parts 722 through which the background can be seen from the front in a see-through manner.

The display control unit 211 controls the slit plate 72, and the slit plate 72 is structured such that the closure parts 721 are turned into dark and the aperture parts 722 can be transparent. Also, an aperture ratio which is a ratio of the aperture parts 722 to the entire slit plate 72 is controlled by the display control unit 211, and luminance of the back light 73 is controlled.

As described above, in the slit plate 72, the closure parts 721 and the aperture parts 722 are structured, and in the data display unit 71, the area 711 for displaying the right screen, the area 712 for displaying the central screen, and the area 713 for displaying left the screen are structured.

With this structure, the right screen displayed in the area 711 is displayed in a direction reaching the position C of FIG. 5 through the aperture parts 722, and visually recognized by a viewer located at the position C.

Also, the central screen displayed in the area 712 is displayed in a direction reaching the position A of FIG. 5 through the aperture parts 722, and visually recognized by a viewer located at the position A.

In addition, the left screen displayed in the area 713 is displayed in a direction reaching the position B of FIG. 5 through the aperture parts 722 and visually recognized by a viewer located at the position B.

That is, the respective viewers located at the positions A to C can view the three different screens of the central screen, the left screen, and the right screen even when the same operation unit 204 is viewed.

Next, a display concept of the operation unit 204 will be described.

Figure 6:
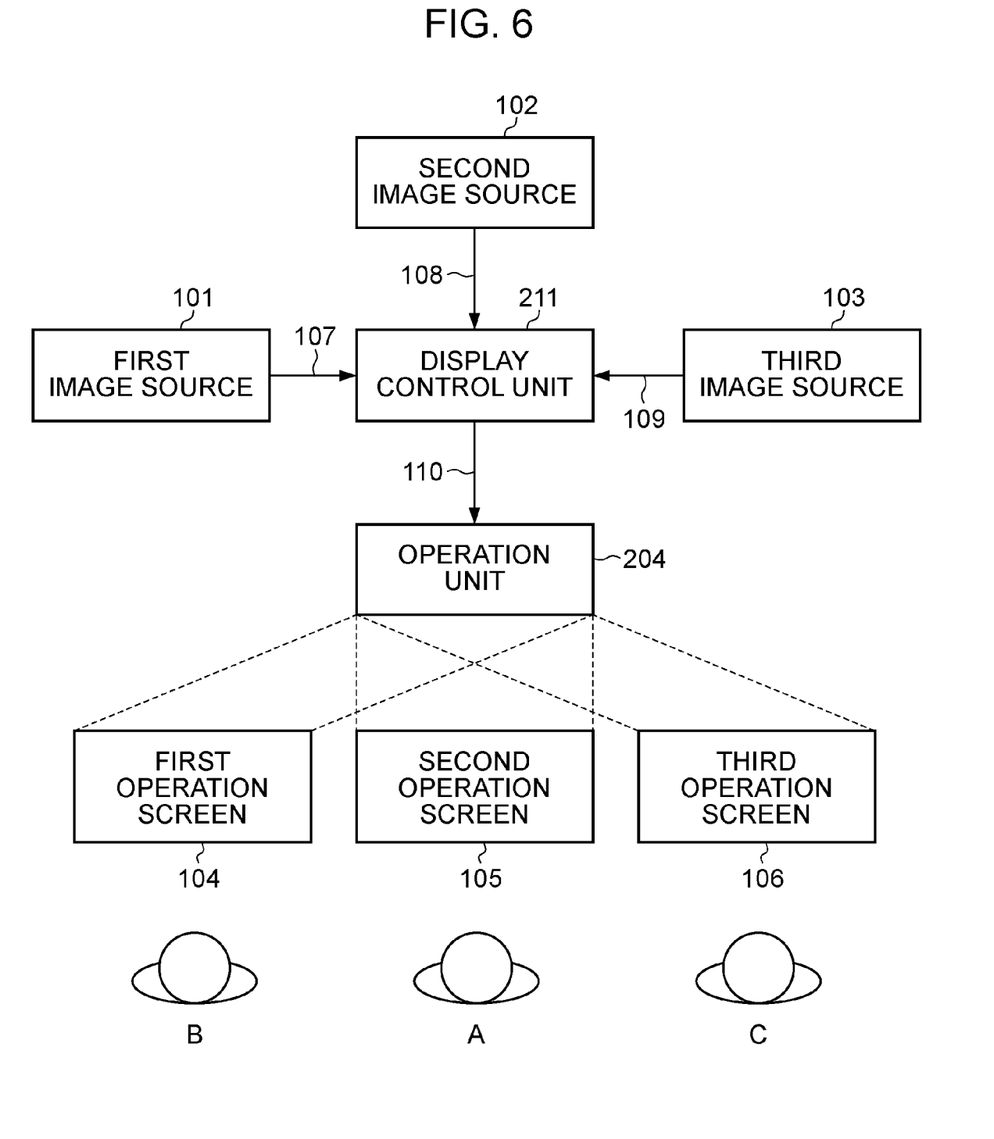
FIG. 6 illustrates a concept of a triple view display by the operation unit illustrated in FIG. 1.

FIG. 6 illustrates a concept of the triple view display in the operation unit 204 illustrated in FIG. 1.

In FIG. 6, from a first image source 101, a second image source 102, and a third image source 103 corresponding to the respective view directions of the triple view, a first image data 107, a second image data 108, and a third image data 109 are transmitted to the display control unit 211.

From the display control unit 211, display data 110 based on the image data and the processing mode is transmitted to the operation unit 204. Then, a first operation screen 104, a second operation screen 105, and a third operation screen 106, which can be viewed and operated from the directions of the positions B, A, and C, are displayed on the operation unit 204.

As illustrated in the schematic diagram of FIG. 6, in accordance with a view angle with respect to the operation unit 204, the users located at the respective positions can substantially simultaneously view the first operation screen 104 from the position B, the second operation screen 105 from the position A, and third operation screen 106 from the position C.

In FIG. 6, the respective image sources 101 to 103 are operation screens for the respective functions of the multifunction peripheral and an operation confirmation/job cancellation screen during the operation. Also, respective image data 107 to 109 are supplied to the display control unit 211 and processed so that images based on those image data can be substantially simultaneously displayed on the operation unit 204.

Next, an operation screen display sequence will be described.

The operation screen display sequence in which the multiview display apparatus according to the present embodiment is used will be described with reference to a flowchart. According to the present embodiment, a description will be provided while taking an example in which the triple view display apparatus is used as the multiview display apparatus.

Figure 7:
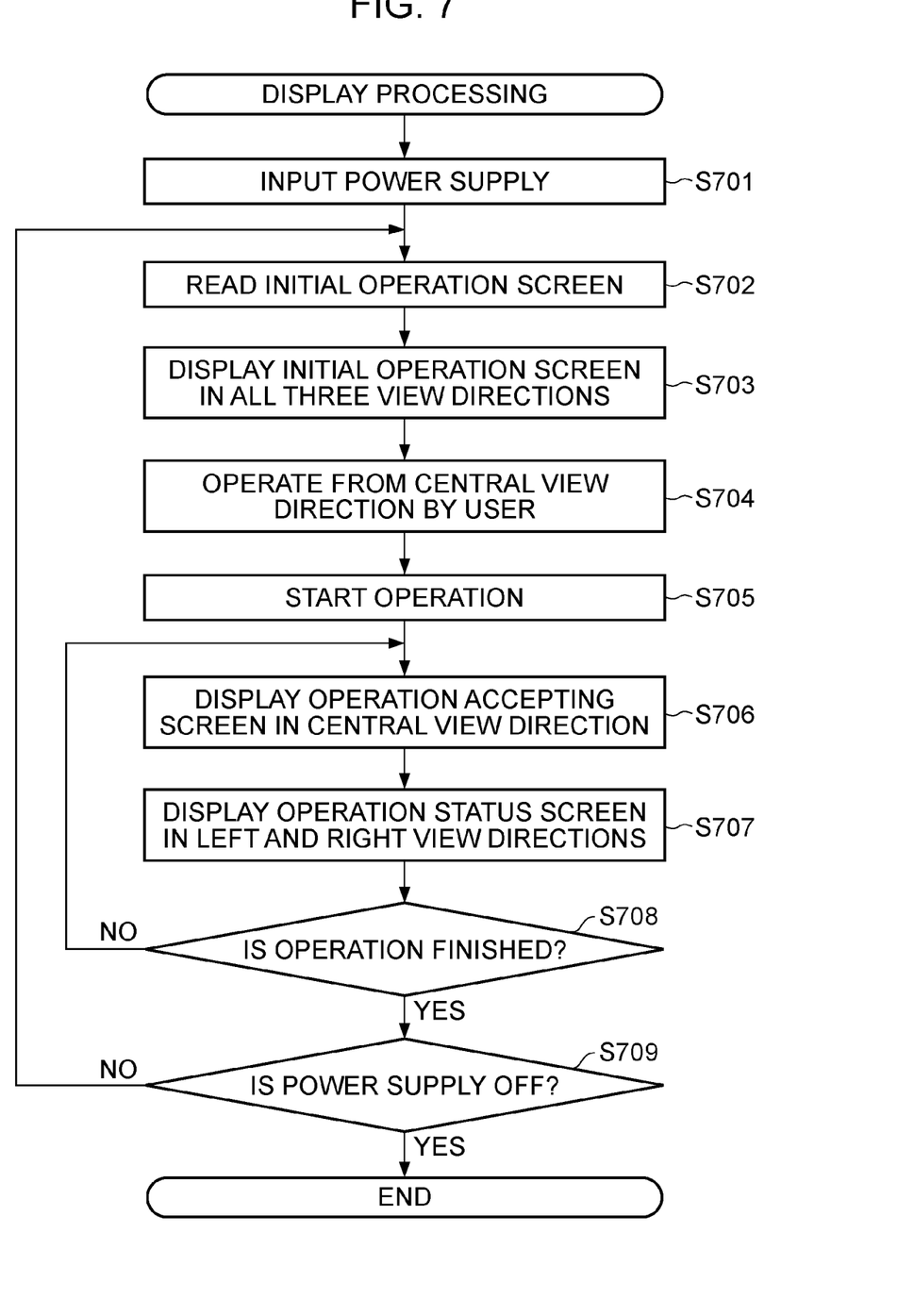
FIG. 7 is a flowchart of a procedure in a processing for displaying an operation screen of the operation unit illustrated in FIG. 1.

FIG. 7 is a flowchart of a procedure in a processing for displaying an operation screen of the operation unit illustrated in FIG. 1.

The present processing is executed under the control of the CPU 205 in FIG. 1. Also, the present processing is executed when the user execute a copy for a plurality of sets. In this way, according to the present embodiment, the CPU 205 performs various controls necessary for this multifunction peripheral including display controls for various user interface screens, but the configuration is not limited to this.

In FIG. 7, first, in Step S701, the user turns the main power supply switch ON. When the power supply is input, the CPU 205 initializes the data processing apparatus.

In Step S702, the CPU 205 prepares initial screen image data on the RAM 208. On the initial screen, it is possible to accept a particular operation from the user.

In Step S703, the display control unit 211 reads the image data of the initial screen from the RAM 208 and transmits display data of the initial screen to the operation unit 204. Then, such a control is performed that the same initial screen is displayed in the three view directions of the triple view liquid crystal display apparatus in the operation unit 204 (first operation screen display unit).

Figure 8:
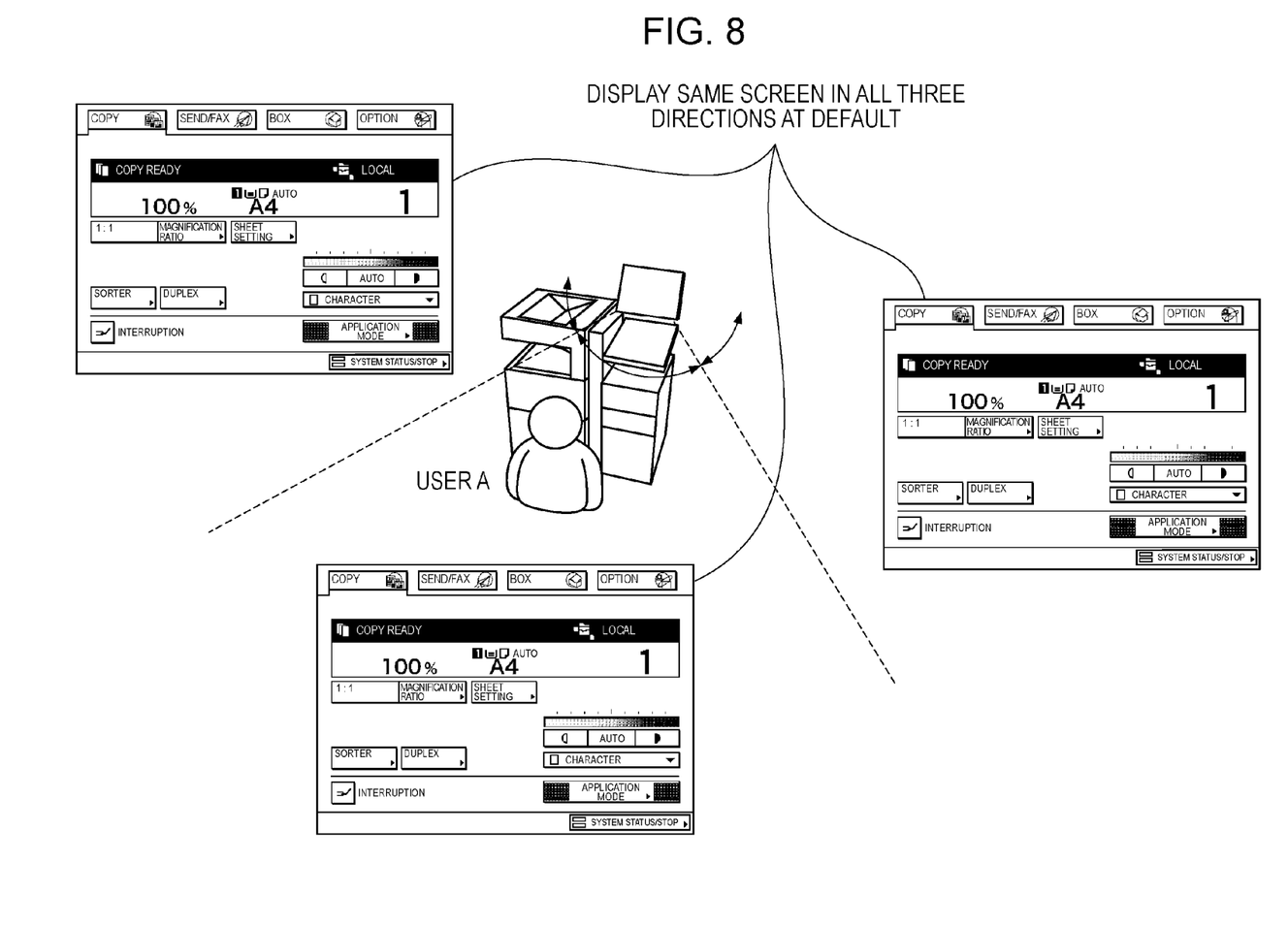
FIG. 8 illustrates an example of a copy initial screen on the operation unit illustrated in FIG. 1 in all three view directions.

FIG. 8 illustrates an example of the initial screen on the operation unit illustrated in FIG. 1 in the three view directions. That is, such a control is performed that the initial screen displayed on the operation unit 204 after the power supply input is the same in the three view directions.

In Step S704, when the user performs a setting on the copy job from the central view direction of the operation unit 204, the CPU 205 inputs the setting contents.

Figures 9A, 9B:
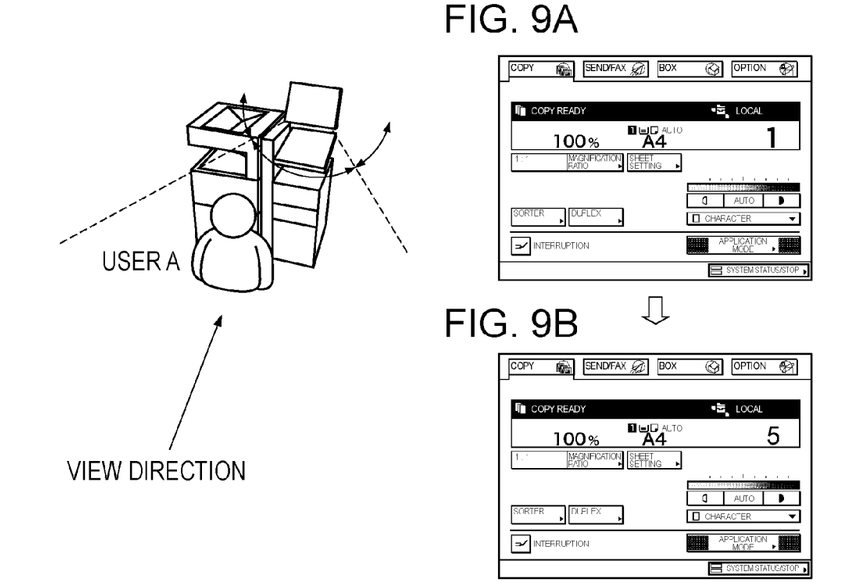
FIGS. 9A to 9C illustrate a transition of a central view direction screen which is displayed when a first user A performs an operation from a central view direction of the operation unit illustrated in FIG. 1.
Figure 9C:
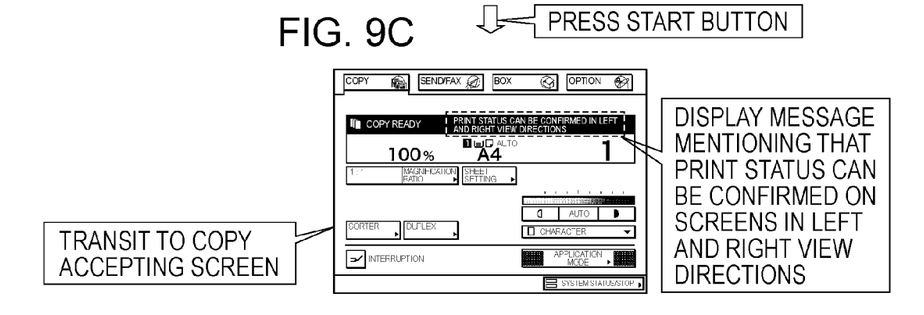

FIGS. 9A to 9C illustrate a transition of the central view direction screen which is displayed when a first user A performs the operation from the central view direction of the operation unit illustrated in FIG. 1.

When the user A sets a document in the ADF 601 and uses the ten-key 406 on the initial screen of FIG. 9A to set the number of sets (5 sets in FIG. 9A), the screen displayed is transited to a copy job setting completion screen illustrated in FIG. 9B.

In Step S705, when the user completes the copy setting through the operation unit 204 and presses the start key 403, the CPU 205 executes the copy operation.

In Step S706, the CPU 205 prepares image data on an operation accepting screen for the central view direction. Then, the display control unit 211 reads the image data on the operation accepting screen, and transmits display data to the operation unit 204 so that the operation accepting screen is displayed in the central view direction. Then, in the central view direction of the operation unit 204, such a control is performed that the operation accepting screen is displayed so that the next user can operate the data processing apparatus (second operation screen display unit). When the user A presses the start key 403, the screen displayed in the central view direction is transited to an operation accepting screen illustrated in FIG. 9C.

The operation accepting screen is basically similar to the initial screen illustrated in FIG. 9A, but a message mentioning that the copy job status instructed by the user A can be confirmed from the left and right view directions is displayed on the status display unit 506.

In Step S707, such a control is performed that the display control unit 211 displays the operation status screen indicating the operation status of the job in execution in the left and right view directions of the operation unit 204 (operation status screen display unit). At this time, the CPU 205 prepares screen data of the operation status screen on the RAM 208. The display control unit 211 reads the image data of the operation status screen from the RAM 208, and transmits display data to the operation unit 204 so that the operation status screen is displayed in the left and right view directions.

Figures 10A, 10B:
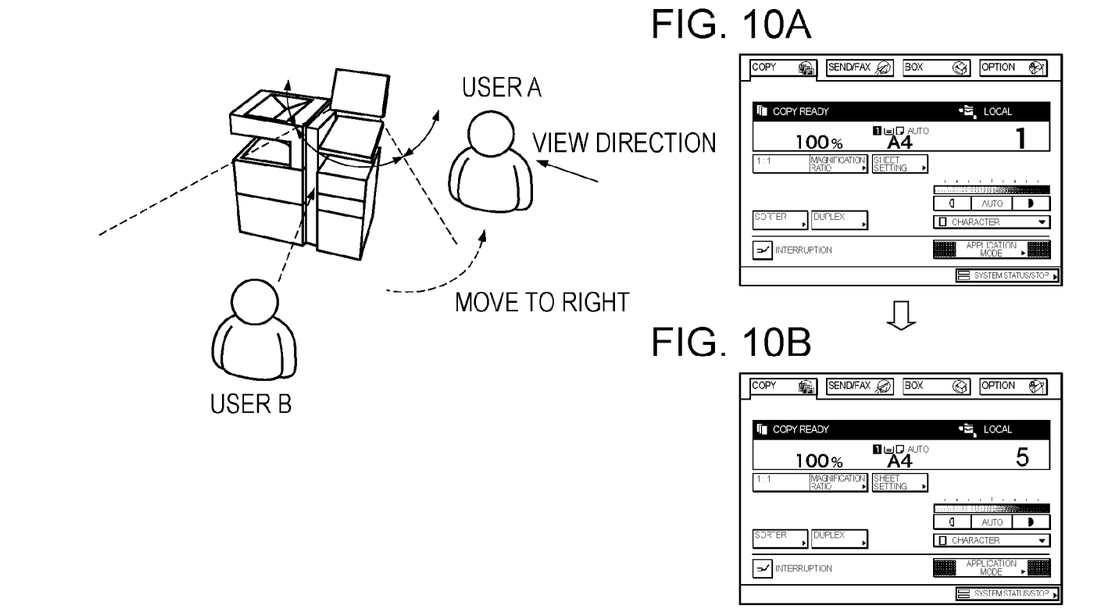
FIGS. 10A to 10C illustrate a transition of a left and right view direction screen which is displayed when the user A confirms an operation status from left and right view directions of the operation unit illustrated in FIG. 1.
Figure 10C:
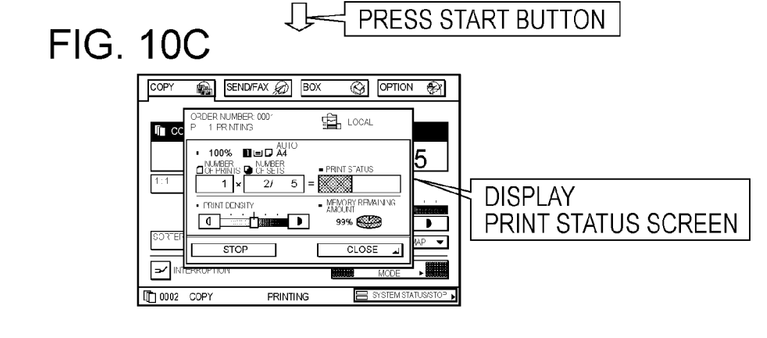

FIGS. 10A to 10C illustrate a transition of a left and right view direction screen which is displayed when the user A confirms an operation status from left and right view directions of the operation unit illustrated in FIG. 1.

The transition of the operation screen in FIGS. 10A and 10B is similar to the transition in FIGS. 9A and 9B. When the start key 403 is pressed, the operation status screen as illustrated in FIG. 10C is displayed in the left and right view directions. That is, such a control is performed that the display is automatically executed in accordance with the start of the copy operation. On the other hand, the operation accepting screen illustrated in FIG. 9C is displayed in the central view direction. For example, when the user A moves towards the right and views the operation status screen from the right view direction, the user B can view the operation accepting screen and operate the data processing apparatus from the central view direction.

When different operation screens are displayed in different view directions, the display control unit 211 performs such a control that the operation buttons displayed in the respective view directions are not overlapped by one another. The users originally touch the same touch panel display to press the operation buttons. If the operation buttons are overlapped in the respective view directions, the operation button in which view direction cannot be found out.

Figure 11:
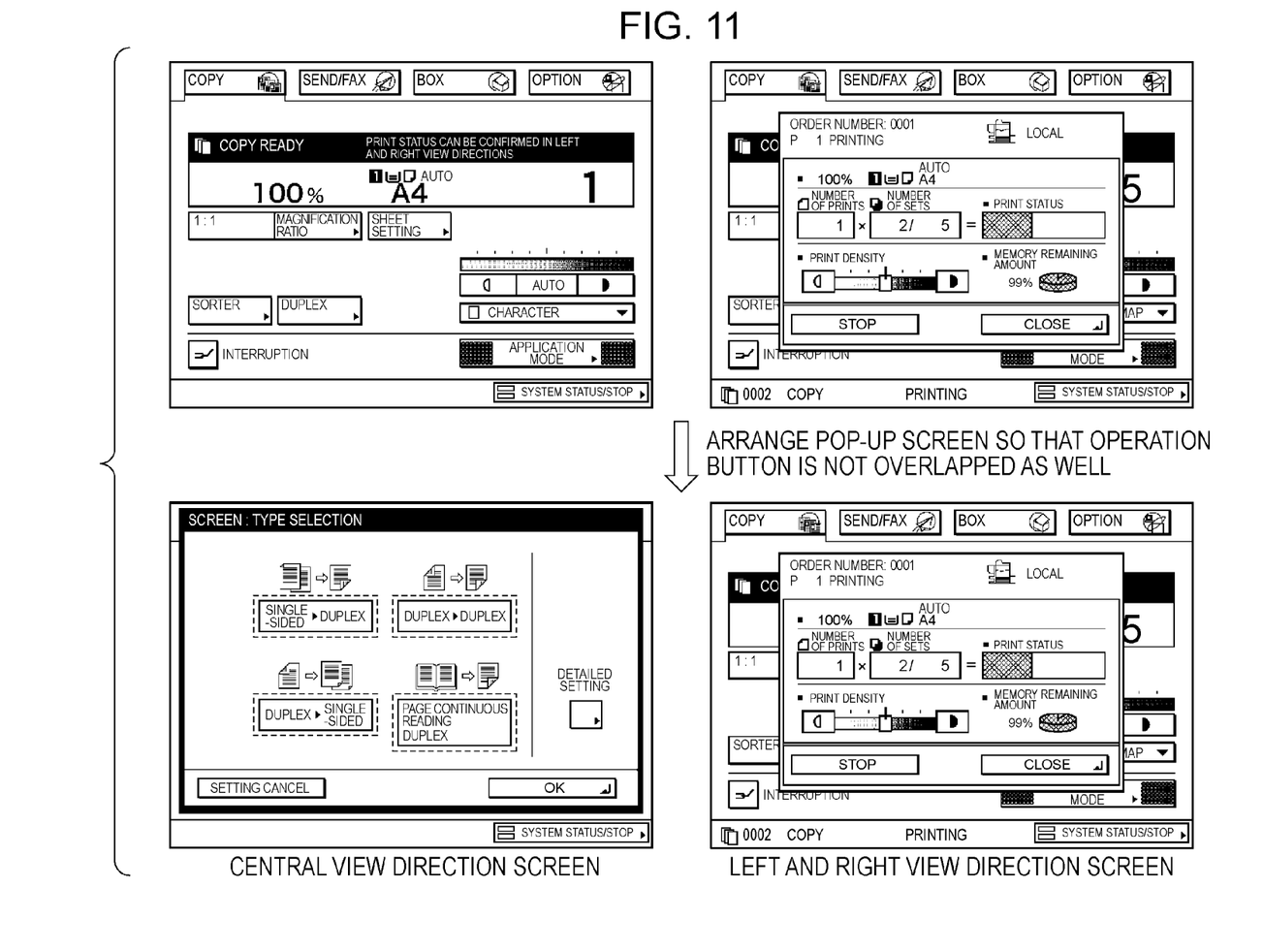
FIG. 11 illustrates transitions of operation buttons in the operation screens in the central view direction and the left and right view directions of the operation unit illustrated in FIG. 1.

FIG. 11 illustrates transitions of operation buttons in the operation screens in the central view direction and the left and right view directions of the operation unit 204 illustrated in FIG. 1.

Examples of the operation button on the screen in the central view direction include SINGLE-SIDED→DUPLEX, DUPLEX→DUPLEX, DUPLEX→SINGLE-SIDED, and PAGE CONTINUOUS READING. Examples of the operation button on the screen in the left and right view directions STOP and CLOSE.

As illustrated in FIG. 11, the display control unit 211 control the display each time the screens are displayed so that the locations of the operation buttons on the screen in the central view direction are not overlapped with the locations of the operation buttons on the screens in the left and right view directions.

In Step S708, the CPU 205 determines whether the copy operation is finished. When the copy operation is finished, the flow is transited to Step S709. When the copy operation is not finished, the flow is transited to Step S706, where the control is continued for displaying the different operation screens in the central view direction and the left and right view directions.

The user turns the power supply OFF when the data processing apparatus is not used. In Step S709, when the power supply is turned OFF, the processing is ended. When the power supply is not turned OFF, the flow is transited to Step S702 to continue the processing.

It is noted that in the flowchart of FIG. 7, as described above, in the data processing apparatus according to the embodiment of the present invention, when the user finishes the setting operation, the confirmation of the job operation status from the left and right view directions and the acceptance of the new setting operation from the central view direction can be simultaneously performed.

Therefore, even when a large number of sets are printed, as the user can perform the operation status confirmation/job cancel from the left and right view directions, it is possible for another user to perform a new job operation from the central view direction.

Thus, as the occupation in the operation unit due to the mass print can be suppressed, such an effect is attained that the operation unit can be efficiently used in accordance with the operation status.

In addition, the embodiments of the present invention can be achieved by executing the following processing. That is, in the processing, a storage medium in which a program code (module) for realizing the above-described functions according to the embodiment is stored is supplied to a system or an apparatus, and a computer (such as a CPU or an MPU) of the system or the apparatus reads the program code stored in the storage medium.

In this case, the program code itself read from the storage medium realizes the above-described functions according to the embodiment, and therefore the program code and the storage medium storing the program code constitute the embodiments of the present invention.

Also, the following products can be used as the storage medium for supplying the program code. For example, a floppy (registered trademark) disk, a hard disk, an opto-magnetic disk, a CD-ROM, a CD-R, a CD-RW, a DVD-ROM, a DVD-RAM, a DVD-RW, a DVD+RW, a magnetic tape, a non-volatile memory card, and a ROM can be used. Alternatively, the program code may be downloaded via a network.

In addition, embodiments of the present invention also encompass a case in which the above-described functions according to the embodiment are realized by executing the program code read by the computer. Moreover, embodiments of the present invention also encompass a case in which based on the instructions of the program code, an OS (operation system) or the like running on the computer performs a part or all of the actual processing, and the above-described functions according to the embodiment are realized through the processing.

Furthermore, embodiments of the present invention also encompass a case in which the above-described functions according to an embodiment are realized through the following processing. That is, the program code itself read from the storage medium is written in a memory provided to a function expansion board inserted in the computer or a function expansion unit connected to the computer. After that, based on the instructions of the program code, the CPU or the like provided to the function expansion board or the function expansion unit performs a part or all of the actual processing.

In this way, according to the present embodiment, it is possible to improve the usability of the user interface screen which becomes the use targets when a plurality of users simultaneously and/or continuously use a certain apparatus such as the data processing apparatus represented by the multifunction peripheral. In this way, according to the present embodiment, it is possible to provide the structure applied to contribute to the convenient operation environment.

The present invention is not limited to the above embodiments, and various modifications (including organic combinations of embodiments) can be made without departing from the scope of the invention, and are not excluded from the scope of the invention.

Various examples and embodiments of the present invention have been described. It is apparent to those skilled in the art that the scope of the invention is not limited to a specific description in the specification, but is defined by the following claims.

The scope of the following claims is to be accorded the broadest interpretation so as to encompass all such equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all modification and equivalent structures and functions.

This application claims the benefit of Japanese Application No. 2007-049487 filed Feb. 28, 2007, which is hereby incorporated by reference herein in its entirety.

What is claimed is:

1. A display system comprising:
   a display unit configured to display information in a first direction and a second direction respectively, wherein the information being displayed in the first direction is not confirmed by a user of the second direction and the information being displayed in the second direction is not confirmed by a user of the first direction; and a display control unit configured to control the display unit to display, in the first direction, a user interface for receiving a first instruction for processing to be performed by an apparatus, to control the display unit to display, in the second direction, a status of the processing based on the first instruction, and to control the display unit to display, in the first direction different from the second direction in which the status of the processing is being displayed, a user interface for receiving a second instruction for another processing to be performed by the apparatus, after receiving the first instruction.

2. The display system according to claim 1, wherein the user interface includes an operation screen which is configured to respond to a manual input received from the user of the first direction, and wherein contents of the operation screen are unable to be confirmed by the user of the second direction.

3. The display system according to claim 1, wherein the display control unit controls the display unit to display, in the second direction, a status screen which is configured to display the status, contents of the status screen being unable to be confirmed by the user of the first direction.

4. The display system according to claim 3, wherein the contents of the status screen are able to be confirmed by the user of the second direction and a user of third direction which is different from the first and second directions.

5. The display system according to claim 4, wherein the status screen is configured to display a progress bar about the status.

6. The display system according to claim 4, wherein the status screen is configured to be able to input an instruction for canceling the processing.

7. The display system according to claim 4, wherein the status screen is displayed automatically with starting the processing.

8. The display system according to claim 7, wherein the status screen is closed with ending the processing.

9. The display system according to claim 1, wherein the apparatus has at least one of a printing function and a data-transmitting function.

10. A non-transitory computer-readable storage medium storing a program for causing a computer system to perform a method, the method comprising:

controlling a display unit to display, in a first direction, a user interface for receiving a first instruction for processing to be performed by an apparatus, wherein the user interface being displayed in the first direction is not confirmed by a user of a second direction different from the first direction;

controlling the display unit to display, in the second direction, a status of the processing based on the first instruction; and controlling the display unit to display, in the first direction different from the second direction in which the status of the processing is being displayed, a user interface for receiving a second instruction for another processing to be performed by the apparatus, after receiving the first instruction.

11. The display system according to claim 1, wherein, after receiving the first instruction, the display control unit controls the display unit to display the user interface for receiving the second instruction and providing a message which indicates that the status of the processing is confirmed in the second direction.

12. The display system according to claim 1, wherein
the display unit is a touch panel display,
the display control unit controls the display unit to display, in the second direction, the status of the processing and a button for receiving a third instruction about an operation of the apparatus, and
the display control unit controls the display unit to display, in the first direction, a button for receiving the second instruction so that a location of the button being displayed in the first direction is not overlapped with a location of the button being displayed in the second direction.

13. A data processing apparatus comprising:
a display unit configured to display information in a first direction and a second direction respectively, wherein the information being displayed in the first direction is not confirmed by a user of the second direction and the information being displayed in the second direction is not confirmed by a user of the first direction; and a display control unit configured to control the display unit to display, in the first direction, a user interface for receiving a first instruction for processing to be performed by the data processing apparatus, to control the display unit to display, in the second direction, a status of the processing based on the first instruction, and to control the display unit to display, in the first direction different from the second direction in which the status of the processing is being displayed, a user interface for receiving a second instruction for another processing to be performed by the data processing apparatus, after receiving the first instruction.

* * * * *